United States Patent
Maurer

[11] 3,785,716
[45] Jan. 15, 1974

[54] OPTICAL WAVEGUIDE DELAY LINE

[75] Inventor: Robert D. Maurer, Painted Post, N.Y.

[73] Assignee: Corning Glass Works, Corning, N.Y.

[22] Filed: Jan. 3, 1972

[21] Appl. No.: 214,897

[52] U.S. Cl............................ 350/96 WG, 350/96 R
[51] Int. Cl. ............................................... G02b 5/14
[58] Field of Search ..................... 350/96 R, 96 WG

[56] References Cited
UNITED STATES PATENTS

| | | | |
|---|---|---|---|
| 3,596,104 | 7/1971 | Macomber | 350/96 WG X |
| 3,157,726 | 11/1964 | Hicks et al. | 350/96 WG |
| 3,493,288 | 2/1970 | Kaufman et al. | 350/96 WG UX |
| 3,471,215 | 10/1969 | Snitzer | 350/96 B |
| 3,646,462 | 2/1972 | Snitzer | 350/96 WG X |
| 3,687,514 | 8/1972 | Miller et al. | 350/96 WG |
| 3,705,992 | 12/1972 | Ippen et al. | 350/96 WG UX |

*Primary Examiner*—John K. Corbin
*Attorney*—Clarence R. Patty, Jr. et al.

[57] ABSTRACT

A glass optical waveguide fiber having a V value in the range of about 1.0 to 35 is coiled about a support member to form one or more layers of fiber. A layer of light absorbing material may be disposed upon the surface of the fiber to prevent cross-talk. Where two or more layers of fiber are disposed on the support member, adjacent layers of fiber may be separated by a layer of light absorbing material if the fiber is not provided with an extramural absorbing layer.

5 Claims, 6 Drawing Figures

PATENTED JAN 15 1974    3,785,716

OPTICAL WAVEGUIDE DELAY LINE

BACKGROUND OF THE INVENTION

I. Field of the Invention

The continually increasing amount of traffic that communication systems are required to handle has forced the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate future increases in traffic. These systems are referred to as optical communication systems since $10^{15}$ Hz is within the frequency spectrum of light. New types of circuits and electrooptic components are required to generate and process the light frequency signals which these future communication systems must accommodate. The present invention relates to an optical delay line for use in circuits for generating and processing light frequency signals.

II. Description of the Prior Art

Conventional optical delay lines consist of a pair of spaced reflecting surfaces which are disposed at proper angles with respect to a light source and a light utilization device so that light from the source is reflected back and forth a number of times between the two reflecting surfaces before reaching the utilization device. The delay line illustrated in FIG. 2 of U.S. Pat. No. 3,093,477 issued to S. Triebwasser is illustrative of this prior art type of optical delay line. The two reflecting surfaces of this type of delay line must be critically aligned to provide a given delay, and they are very sensitive to vibration, a slight movement of a reflecting surface having a large effect on delay due to the multiple reflections of the light beam from the reflecting surfaces. Moreover, such delay lines occupy much space, the aforementioned patent to Triebwasser teaching a 40 meter separation between reflecting surfaces.

SUMMARY OF THE INVENTION

It is therefore an object of the present invention to provide a rugged, compact optical delay line that is insensitive to vibration.

Briefly, the optical delay line of the present invention comprises a glass optical waveguide fiber supported by a support member. The fiber has a value of V in the range of about 1.0 to 35, V being determined by the equation $$V = 2\pi a/\lambda \sqrt{(n_1 + n_2)(n_1 - n_2)}$$

where a is the core radius of the waveguide fiber, $\lambda$ is the wavelength of the light to be transmitted by the delay line, $n_1$ is the core index of refraction and $n_2$ is the cladding index of refraction.

DETAILED DESCRIPTION OF THE INVENTION

Figure 1:
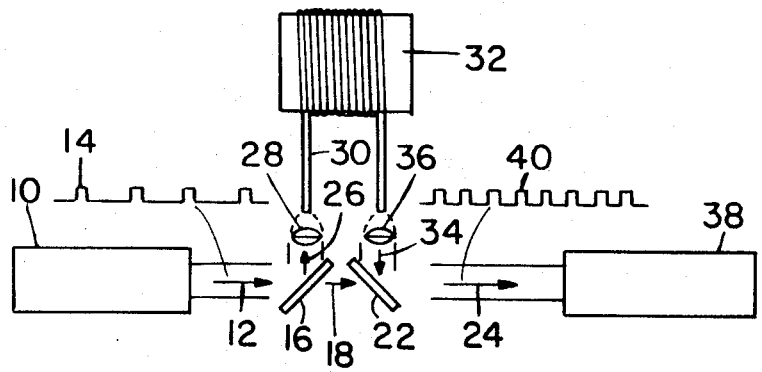
FIG. 1 is a diagrammatic representation of an optical pulse rate multiplier utilizing a delay line constructed in accordance with the present invention.

In the optical pulse rate multiplier shown in FIG. 1 a source of optical pulses such as laser 10 emits a pulsed optical signal illustrated by arrow 12. Waveform diagram 14 indicates that the pulses of optical signal 12 occur at a first pulse repetition rate. This series of pulses may be altered in magnitude to convey information, but for the sake of simplicity this modulation of the pulses is not shown. It is a necessary characteristic of signal 12 that the width of the pulses thereof be much shorter than the separation between pulses. Signal 12 is split by a beam splitter such as a half silvered mirror 16 so that part thereof indicated by arrow 18 impinges upon a second half silvered mirror 22 and forms part of the output optical signal represented by arrow 24. That portion of optical signal 12 which reflects from beam splitter 16 is represented by arrow 26. This latter signal is focused by a lens system illustrated by lens 28 onto the end of an optical waveguide 30, most of which is coiled around a support member 32. The total length of waveguide 30 is such that optical signal 26 is delayed a predetermined amount by passing therethrough. In the pulse rate doubler circuit of FIG. 1, the delay is half the pulse spacing. A delayed optical signal illustrated by arrow 34 is focused by a lens system represented by lens 36 onto mirror 22 from which it is reflected and caused to recombine with signal 18, these two optical signals comprising an output signal 24 which is directed toward utilization device 38. Waveform 40 illustrates that the pulse repetition rate of output signal 24 is twice that of signal 12.

Figure 2:
FIG. 2 is a cross-sectional view of a glass optical waveguide fiber.

The coiled optical waveguides such as waveguide 30, which are utilized in the delay lines of the present invention, may be of the type described in copending application Ser. No. 36,267 entitled "Method of Producing Optical Waveguide Fibers" filed May 11, 1970 now U.S. Pat. No. 3,711,262. It is pointed out in that application that an optical waveguide, one of which is illustrated in FIG. 2, consists of a relatively small diameter core 44 of transparent material having a given index of refraction surrounded by a relatively large diameter sheath 46 of transparent cladding material having a slightly lower index of refraction. It is explained in that application that such an optical wave-guide may be utilized to transmit one or more preselected modes. Unlike conventional optical fibers wherein the ratio of the core diameter to that of the overall fiber is relatively high and wherein the difference between refractive indices of the core and cladding material is made as large as possible, the total diameter to core diameter ratio of optical waveguide fibers is usually between 10:1 and 300:1 for single-mode waveguides and is usually between 1001:1000 and 10:1 for multimode waveguides and the difference in the indices of refraction is maintained small.

Since each mode of light traveling along a glass fiber structure propagates at its own characteristic velocity, there will be a dispersion of information after a given length of fiber due to different propagation velocities if the same information is initially supplied to all modes. It then follows that if light propagation along the optical fiber could be restricted to preselected modes, more effective information transmission would result. The conditions under which propagation of a particular mode will no longer be localized within the core of an optical fiber can be expressed in terms of a cutoff value U. An exceptionally complex equation and an explanation thereof, from which the value of U for a particular mode can be determined may be found on page 55 of Fiber Optics - Principles and Applications by N. S. Kapany. Kapany also expresses a fiber characteristic term R, now commonly referred to as V, in terms of the optical fiber variables by the equation $$V = 2\pi a/\lambda \sqrt{n_1^2 - n_2^2} \quad (1)$$

where a = core radius of the waveguide $\lambda$ = wavelength of light to be transmitted $n_1$ = core index of refraction $n_2$ = cladding index of refraction which can be rewritten as $$V = 2\pi a/\lambda \sqrt{(n_1 + n_2)(n_1 - n_2)} \quad (2)$$

Then, as is explained in Kapany, for a particular mode to propagate within an optical fiber having a particular fiber characteristic term V, V must be greater than or equal to the cutoff value U for said mode.

The mode $HE_{11}$, the definition and physical characteristics of which can be found in the aforementioned cited sources, is the only mode of light that will propagate along a fiber which has a V value of less than 2.405. Therefore, if V is set equal to 2.405, and equation (2) is evaluated it can be seen that a method of limiting light propagation of a desired wave-length to one mode is to coordinate the parameters $a$, $n_1$ and $n_2$ of the waveguide. That is, if the difference between the two indices of refraction ($n_1 - n_2$) increases, the core radius a must decrease, and if the quantity ($n_1 - n_2$) decreases, the core radius a must increase.

The intensity of light in an optical waveguide decreases as the radial distance from the waveguide center increases. Theoretically, of course, this intensity will never be zero regardless of the radial distance from the waveguide center the light travels. By proper selection of the core diameter, and the core and cladding indices of refraction, the decrease in intensity can be made to be so rapid, however, that the intensity can be presumed to be zero at a finite radial distance from the center of a straight section of optical waveguide. There is no intensity distribution common to all waveguides, and intensity distribution will vary with the core diameter, the index of refraction of the core and cladding glass, and with the frequency of the light being transmitted; that is, within the same waveguide infrared light will have a different intensity distribution than will ultraviolet light. If the intensity of the light has not decreased to a very low level when it reaches the cladding-surrounding medium interface of the optical waveguide, three undesirable results may occur. First, light could strike said interface, be dispersed and then be reflected back into the waveguide core region. Second, some of the transmitted light could strike the interface and escape from the optical waveguide as radiation loss. Third, some of the escaped light could penetrate an adjacent optical waveguide thereby causing cross-talk.

Figure 3:
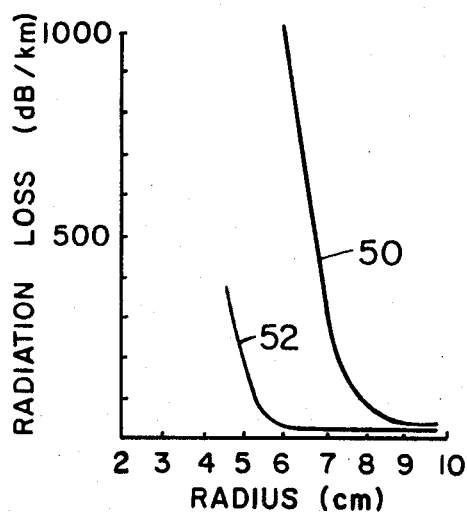
FIG. 3 is a graph illustrating bending loss versus radius of curvature for two single-mode waveguides.

The second and third of the aforementioned undesirable results are particularly troublesome in the optical delay line of the present invention since the bending loss or amount of light radiated from a waveguide increases as the radius of curvature of a curved section of optical waveguide decreases. This is illustrated in FIG. 3 which is a graph of radiation loss in dB per kilometer as a function of radius of curvature in cm for two single-mode waveguides. Curves 50 and 52 depict bending losses for waveguides having V values of 1.22 and 1.31, respectively. These losses were measured at a 632.8 nm wavelength. It is noted, however, that some waveguides can be coiled to a radius of a few centimeters without incurring appreciable losses.

The delay $\tau$ of a glass optical waveguide delay line of the type illustrated in FIG. 1 is given by $$\tau = l/2 \times 10^{-4} \text{ nsec} \quad (3)$$

where $l$ is the length of the fiber in kilometers, the velocity of light through a glass waveguide being about $2 \times 10^{-4}$ km/nsec depending upon the specific glass utilized. For conventional signal processing, where signals are to be somehow combined, allowable losses of only about 3 dB are permissible. Therefore, the allowable loss L (dB/km) is given by $$L \leq 3/l = 1.5 \times 10^4/\tau \quad (4)$$

For signal timing, losses as high as 60 dB are permissible. This leads to $$L \leq 60/l = 3 \times 10^5/\tau \quad (5)$$

Since equation (5) represents the maximum permissible loss contemplated for an optical delay line, this equation will be utilized hereinafter in defining the types of waveguide fibers which are acceptable for use in an optical delay line.

Waveguide parameters must also be chosen to prevent undue broadening of the light pulses which travel therethrough. As a pulse travels through an optical delay line, it will broaden in time width $\Delta\tau$ at the receiver. In general, this broadening will be proportional to the delay line length as indicated by the equation $$\Delta\tau \geq wl = 2 \times 10^{-4} w\tau \quad (6)$$

where $w$ is the pulse broadening coefficient. Moreover, if the position of the delayed pulse is to be determined, it is necessary that pulse broadening be limited to some fraction of the total delay time. In general, pulse broadening greater than 5 percent of the total delay time cannot be tolerated. This results in the equation $$\Delta\tau \leq 0.05 \tau \quad (7)$$

Combining equations (6) and (7) results in the equation $$w \leq 250 \text{ nsec/km} \quad (8)$$

It can be experimentally or theoretically determined that an optical waveguide fiber having a V value of about 35 or less satisfies this requirement.

For the most precise timing and synchronization applications, optical delay lines comprising single mode fibers should be used. As stated hereinabove, this includes waveguides having a V value less than 2.405. It is known that the pulse broadening coefficient w for this type of waveguide fiber is less than 0.1 nsec/km. Since delays of greater than 10 nsec will be the range of interest, the loss determined from equation (5) will be equal to or less than $3 \times 10^4$ dB/km. This has been experimentally determined to include single mode fibers having a V value of about 1.0 or more. The relationship between V value and bending losses can be seen in FIG. 3 wherein a fiber having a V value of 1.22 is shown to have greater radiation losses than a fiber having a V value of 1.31 for a given radius of curvature. Thus, optical delay lines should utilize optical waveguides having a V value between about 1.0 and 35. If a delay line is to be utilized with more than one wavelength of light, the V value of the waveguide fiber should satisfy the above requirement at each wavelength.

Figure 4:
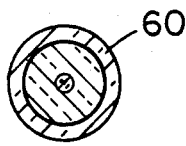
FIG. 4 is a cross-sectional view of a glass optical wave-guide fiber having an extramural light absorbing layer.

Light which radiates from one section of coiled waveguide and enters an adjacent section causes a broadening of the output pulse emitted from the delay line. This cross-talk problem is especially serious for some waveguides having V values near 1.0 or having very small radii of curvature since both types of waveguides incur relatively large radiation losses. Therefore, it may be necessary to provide the optical waveguide with a light absorbing layer such as layer 60 of FIG. 4. Layer 60 may consist of any light absorbing material such as a light absorbing glass, metal, plastic or the like which prevents light from radiating from one section of coiled waveguide into an adjacent section.

Figure 5:
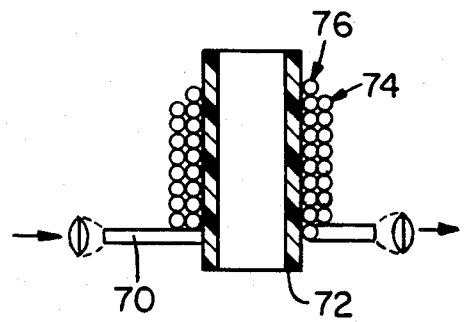
FIG. 5 is a cross-sectional view of an optical delay line having a plurality of overlapping layers of glass optical wave-guide fiber.

FIG. 5 illustrates a more compact form of optical delay line wherein an optical waveguide 70 is coiled around a supporting member 72 in such a manner that two or more layers are formed. In this type of arrangement, wherein one layer 74 of coiled waveguide fiber is disposed directly upon the surface another layer 76, cross talk between layers can cause severe pulse broadening. It is therefore preferred that optical delay lines of the type illustrated in FIG. 5 be constructed from optical waveguides of the type illustrated in FIG. 4.

Figure 6:
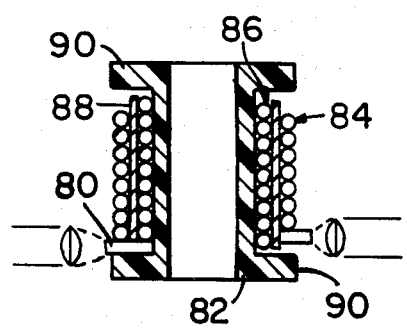
FIG. 6 is a cross-sectional view of a modification of the delay line of FIG. 5.

Since it is more difficult to manufacture waveguide fibers having light absorbing cladding, the embodiment shown in FIG. 6 may be preferred to that of FIG. 5. In FIG. 6, the waveguide fiber 80 is wound about support member 82 in such a manner that outer layer 84 of coiled waveguide is separated from inner layer 86 by a tube 88 of light absorbing material. Tube 88 prevents cross talk between the fibers which form layers 84 and 86 and therefore prevents the occurrence of severe pulse broadening.

Although FIGS. 5 and 6 illustrate only two layers of fiber disposed upon a support member, it is obvious that many layers could be employed to form a very compact delay line. Moreover, depending upon the desired geometry of the delay line, a disc-shaped support may be preferred over the elongated supports illustrated in FIGS. 1, 5 and 6. In such an embodiment the number of layers of fibers may exceed the number of fibers per layer. Flanges 90 shown in FIG. 6 may be used to confine the layers of waveguide fiber, especially in those embodiments wherein many layers of fiber are formed on the support member. Also, the support member is not limited to the cylindrically shaped supports illustrated in the figures. For example, a coil of waveguide fiber could be secured or wrapped by support means, or it could be potted in a material which forms a support member upon hardening.

I claim:

1. An optical delay line comprising
a support member,
a coil of glass optical waveguide fiber supported by said support member, said fiber having a value of V in the range of about 1.0 to 35, V being determined by the equation $$V = 2\pi a/\lambda \sqrt{(n_1 + n_2)(n_1 - n_2)}$$

where a is the core radius of the waveguide fiber, $\lambda$ is the wavelength of the light to be transmitted by the delay line, $n_1$ is the core index of refraction and $n_2$ is the cladding index of refraction, said optical waveguide fiber being coiled in such a manner that a plurality of overlapping layers of waveguide fiber is formed, and a tube of light absorbing material disposed between each adjacent pair of layers of waveguide fiber.

2. An optical delay line in accordance with claim 1 further comprising means adjacent to one end of said fiber for launching an optical signal therein and means adjacent to the other end of said fiber for directing light emanating therefrom toward a utilization device.

3. An optical delay line in accordance with claim 1 wherein the V value of the said optical waveguide fiber is within the range of about 1.0 to 2.4, whereby a single mode of light is transmitted within said fiber.

4. An optical delay line comprising
a support member,
a coil of glass multimode optical waveguide fiber supported by said support member, said fiber comprising a core of glass having an index of refraction $n_1$ surrounded by a sheath of glass having an index of refraction $n_2$ which is lower than that of said core glass, said fiber having a value of V between about 2.4 and 35, V being determined by the equation $$V = 2\pi a/\lambda \sqrt{(n_1 + n_2)(n_1 - n_2)}$$

where a is the core radius of the waveguide fiber and $\lambda$ is the wavelength of the light to be transmitted by the delay line, said optical waveguide fiber being coiled in such a manner that a plurality of overlapping layers of waveguide fiber is formed, and
light absorbing means disposed upon the entire surface of said sheath to prevent light from radiating from one section of coiled waveguide and entering an adjacent section thereof.

5. An optical delay line comprising:
a support member,
a coil of glass optical waveguide fiber supported by said support member, said fiber comprising a core of glass having an index of refraction $n_1$ surrounded by a sheath of glass having an index of refraction $n_2$ which is lower than that of said core glass, said fiber having a value of V in the range of about 1.0 to 2.4 whereby a single mode of light is transmitted within said fiber, V being determined by the equation $$V = 2\pi a/\lambda \sqrt{(n_1 + n_2)(n_1 - n_2)}$$

where a is the core radius of the waveguide fiber and

λ is the wavelength of light to be transmitted by the delay line, said optical waveguide fiber being coiled in such a manner that a plurality of overlapping layers of waveguide fiber is formed, and light absorbing means disposed upon the entire surface of said sheath to prevent light from radiating from one section of coiled waveguide and entering an adjacent section thereof.

* * * * *